United States Patent [19]
Tomita
[11] Patent Number: 4,566,401
[45] Date of Patent: Jan. 28, 1986

[54] DYNAMIC CURRENT INTERRUPTION-TYPE INDICATORS AND METHOD THEREFOR

[75] Inventor: Masao Tomita, Nagoya, Japan
[73] Assignee: Kinki Denki Co., Ltd., Nagoya, Japan

[21] Appl. No.: 526,633
[22] Filed: Aug. 26, 1983

[30] Foreign Application Priority Data

Apr. 4, 1983 [JP] Japan .................................. 58-59085
Apr. 4, 1983 [JP] Japan .................................. 58-59087

[51] Int. Cl.[4] .................................................. G01D 3/04
[52] U.S. Cl. .................................... 116/207; 116/209; 116/DIG. 33; 361/124; 361/125; 361/137
[58] Field of Search ............... 116/207, DIG. 33, 209; 361/125, 134, 137, 230, 124; 102/202, 202.7; 200/144 R, 61.03; 340/649, 635

[56] References Cited

U.S. PATENT DOCUMENTS 1,116,303 11/1914 Locke .................................. 361/125
1,127,043 2/1915 Locke .................................. 361/125
2,609,432 9/1952 Steen .................................. 361/125
2,989,608 6/1961 Hicks .................................. 361/125
3,422,763 1/1969 Wait .................................... 102/202
3,668,458 6/1972 Irle ...................................... 361/125
3,894,086 7/1975 Lerom .............................. 102/202.7

FOREIGN PATENT DOCUMENTS 3133787 3/1983 Fed. Rep. of Germany .

*Primary Examiner*—Charles Frankfort
*Assistant Examiner*—Denis E. Corr
*Attorney, Agent, or Firm*—Burton & Dorr

[57] ABSTRACT

An improved dynamic current interruption-type flashover indicator responsive to lightning strikes for releasing from the tip of arc horns located on power transmission towers and for interrupting the resulting dynamic current. The present invention utilizes a uniquely designed propellant having a formed center hole extending the longitudinal length of the propellant and containing therein a fuse wire extending from a separation plate at one end and engaging an inserted pin at the other end. When lightning strikes, the resulting arc is lead into and throughout the formed center hole by the fuse wire, the fuse wire melts and the temperature of the arc causes the propellant to vaporize uniformly into steam and the resulting gaseous force causes the indicator to become rocket-like and to suddenly leave the tip of the arc horn. The resultant vapor trail of the flashover indicator being of high conductivity leads the dynamic current away from the transmission tower in order to substantially cut down on the dynamic current.

7 Claims, 5 Drawing Figures

DYNAMIC CURRENT INTERRUPTION-TYPE INDICATORS AND METHOD THEREFOR

DISCUSSION OF PRIOR ART

1. Field of Invention

The present invention relates to flashover indicators for transmission power towers and, more particularly, to flashover indicators capable of dynamic current interruption generated by lightning strikes.

2. Prior Art

Lightning strikes on transmission power towers can cause faults to occur and when this occurs, it is highly desirable to ascertain which power transmission towers were struck or damaged by lightning. One prior art approach is to use flashover indicators installed on the tip of the arc horns on such towers. When a lightning strike occurs, and the lightning arcs between the tips of opposing arc horns, the flashover indicators located on the arc horns fly off to indicate which tower was struck. Such prior art flashover indicators are typically colored bright yellow and can be readily seen or not seen by repairmen on the ground. Hence, repairmen can climb the towers which have one or more flashover indicators missing to inspect for damage.

One prior art approach set forth in a January, 1978 brochure issued by Kinki Denki Co. Ltd., the assignee of the present invention, sets forth a "jump out" indicator having an empty passageway which in the presence of a lightning flashover becomes heated so that the pressure of the air inside of the empty passageway substantially increases to cause the indicator to fly out from the arc horn or rod.

This type of prior art approach was discussed by Emi, in *Development of A Jump Out Type Flashover Indicator for Transmission Line*, in Special Document R-8010 for IERE Members, December, 1980, Japan IERE Counsel. In this paper, the "jump out" flashover indicator was improved upon by adding a propellant such as gun powder into the empty passageway. When lightning struck creating a flashover condition, the gun powder became ignited causing the indicator to leave the arc rod with greater force or pressure then without using the propellant.

The improved upon indicator also exhibited greater dynamic current interruption. Dynamic current interruption occurs by causing the flashover indicator to break the path of current conduction between the two opposing arc rod ends by providing a path of higher conductivity. Such dynamic current interruption is important to prevent damage to the system. Hence, the improved dynamic current interruption-type indicator would not only provide indication by removing the indicator from the end of the arc rod with more force, but it would also interrupt the dynamic current by causing the dynamic current to follow the indicator. This reference recognized that although the characteristics of the dynamic current interrupter-type flashover indicator were important, however, the results presented were essentially experimental in that an optimum commercial indicator was not yet available.

This latter type of dynamic current interruption-type indicator, utilizing a propellant, was the subject of two Japanese patents also assigned to the assignee of the present invention and identified as Japanese Pat. Nos. 57-9678 effective Feb. 23, 1982 and 57-10074 effective Feb. 26, 1982. Although the use of a propellant in the formed hollow passageway offered an improved design over prior flashover indicators using only an empty hollow passageway, problems were still apparent. In operation, the lightning arc did not go through the middle of the propellant but went around the propellant—i.e., between the propellant and the inside of the indicator and, therefore, did not reliably release from the arc horn nor did it always or uniformly cut the dynamic current down.

SUMMARY OF THE INVENTION

Figure 1:
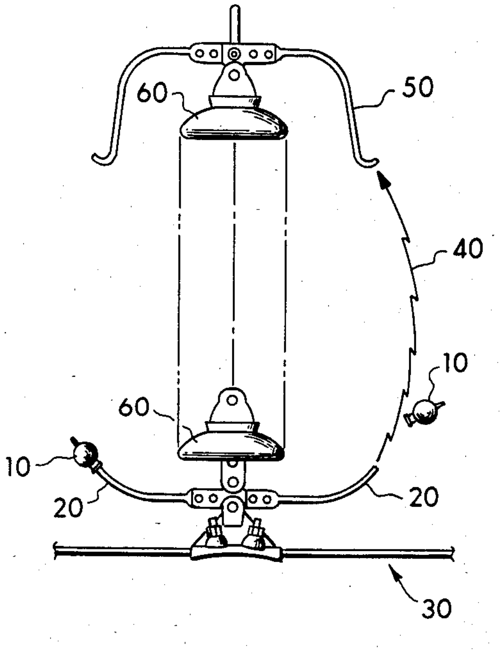
Fig. 1 PRIOR ART
FIG. 1 sets forth a prior art representation of two opposing arc horns separated by a series of suspension insulators on the tower of a transmission line with prior art flashover indicators installed on the tips of the arc horns.

The problem in designing a flashover indicator capable of dynamic current interruption, therefore, is to design a flashover indicator that can be uniformly and reliably released from the tip of the arc rod in the event of a lightning strike and, furthermore, to uniformly and reliably interrupt the dynamic current in order to prevent damage to the transmission system.

The present invention solves these problems by providing an apparatus and method for dynamic current interruption and for the reliable release of the indicators from the tip of the arc rods. The present invention utilizes a uniquely designed propellant having a centered and formed hole extending the longitudinal length of the propellant and containing therein a fuse wire extending from the separation plate at one end and engaging at its other end a pin. When lightning strikes, the arc is lead into and throughout the center formed hole by the fuse wire, the fuse wire melts and the temperature of the arc causes the propellant to vaporize uniformly into steam and the gaseous force causes the indicator to become rocket-like and to suddenly leave the tip of the arc horn. The resultant vapor trail of the flashover indicator being of high conductivity leads the dynamic current away from the transmission tower and this action substantially cuts down the dynamic current.

Improved rocket propellants, especially well-suited for use in dynamic current interruptor rockets, are provided by compounds characterized by their ability to take water of hydration and hold it while the propellant is in a solid form. If this water of hydration can be quickly, i.e., instantaneously, vaporized the resulting steam can be used as an impulse propellant. Assuming a suitable heat source, an instantaneous heating of the water of hydration can be obtained by use of an inorganic fiber mesh embedded within the solid propellant's body. Highly hydrated, highly oxidized mineral salts are particularly useful for the purposes of this invention. Compounds comprised of boric acid hydrate $HBO_2 \cdot H_2O$ and a plaster forming agent comprising calcium oxide hydrate $CaO.H_2O$ and sodium sulfate hydrate $Na_2SO_4.1OH_2O$, all of which are compounded and intimately commingled with a heat conducting inorganic fiber such a glass wool are highly preferred for such impulse rocket propellant purposes.

Applicant purposely uses somewhat unconventional chemical terminology in describing many of the ingredients of these propellants to emphasize that the water of hydration concept is important to the operation of these particular propellants. For example, sodium sulfate hydrate might be more commonly called sodium sulfate decahydrate or Glauber's salt.

In any event, such hydrates may be formed in a number of ways. For example, a mixture of borax ($Na_2B_4O_7.1OH_2O$), slaked lime ($Ca(OH)_2$), Glauber's salt ($Na_2SO_4.1OH_2O$), disodium phosphate dodecahydrate ($Na_2HPO_4.12H_2O$), and optionally aluminum oxide ($A1_2O_3$) can be mixed with enough water to form a wet plastic around a matrix of an inorganic fiber such as a glass wool.

When such compounds are allowed to dry, loaded into dynamic current interruptor rockets, and instantaneously heated, the water of hydration of the ingredients instantaneously vaporizes to produce steam which can in turn be used to propel the rocket. The resulting salts of the formerly hydrated ingredients are entrained within the steam. Upon coming into contact with the atmosphere, the steam condenses into fine droplets into which the entrained salts dissolve and ionize. Because of its high conductivity, the rocket's electrolyte bridge through which lightning can be removed from sensitive objects and conveniently grounded. Such sensitive objects might include, but not be limited to, electrical equipment such as insulators, generators, towers and the like, buildings, and aircraft. Preferably the propellant is activated by a conducting wire which is embedded within the dried propellant. Dynamic current interruptor propellants are most conveniently activated by the reaction of the lightning itself. In any case, the electrical current is initially led into the body of the propellant by means of conducting wires. Thereupon the glass fibers embedded within the propellant pick up and conduct the heat caused by the current surge throughout the propellant body. This causes the water of hydration of the various hydrated ingredients to more or less instantaneously vaporize into steam which can be harnessed by known methods to propel the rocket. The ingredients of these rocket propellants can be compounded over a wide range of proportions to produce a range of desired characteristics. The easiest method for preparing the preferred propellant compound of this invention consists of making a paste of the boric acid hydrate and the plaster forming agents, i.e., the calcium oxide hydrate and the sodium sulfate hydrate, and then adding the resulting paste to the inorganic fiber. The resulting paste is packed around a center rod and allowed to dry. After drying, the center rod is removed and replaced by an electrical conductor wire which leads the electrical current caused by the lightning to the propellant body. Preferably the wire is embedded substantially through the entire length of the propellant body to facilitate instantaneous activation.

DISCUSSION OF PREFERRED EMBODIMENT

1. Discussion of Prior Art

Figure 2:
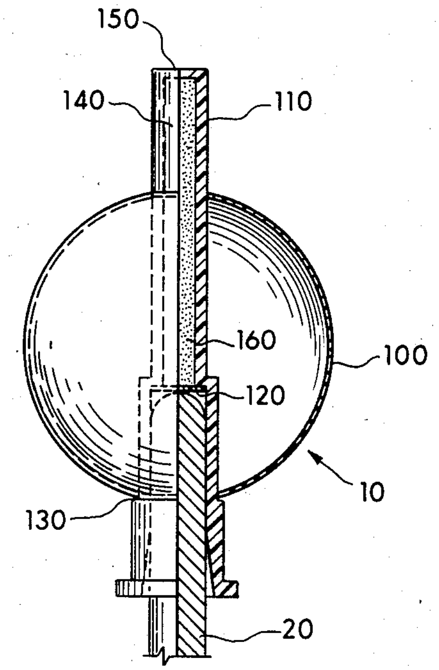
Fig. 2 PRIOR ART
FIG. 2 sets forth, in partial cross-section, a side planar view of the prior art dynamic current interruption-type flashover indicator as seen in FIG. 1.

FIGS. 1 and 2 set forth in a prior art flashover indicator arrangement. In FIG. 1, two flashover indicators 10 are shown installed at the tip of arc horns 20 on a conventional transmission line 30. When lightning hits the transmission line 30, dynamic current from the lightning can flow from the bottom arc horn 20 through the air as indicated by arrow 40 to an upper arc horn 50. The arc horns are separated by insulators 60 mounted to the transmission tower (not shown). This passage of dynamic current is termed "flashover".

The prior art flashover indicator shown in FIG. 2 is composed of a globe 100, a base 110 and a separation board or plate 120. The globe indicator is preferably made from a highly visible colored plastic material and is typically coated bright yellow. The globe 100 is hollow being of thin walled construction. The globe 100 press-fittingly engages the base member 110 and abuts against a support ledge 130 in a press fitting engagement. The separation plate 120 closes off a hollow cylindrically shaped passageway 140 on the interior of the base member 110.

In one form of a prior art approach, the passageway or chamber 140 is empty and when flashover occurs, dynamic current flows from the arc rod 20 through the separation plate 120 through the interior of the passageway 140 and out the orifice 150. The air in the passageway 140 expands instantaneously causing the entire flashover indicator 10 to fly off the end of the arc rod 20 as shown in FIG. 1. The problem with this approach is that it does not always reliably leave the arc horn 20 nor does it always or uniformly break the dynamic current 40 flowing from the lower arc rod 20 to the upper arc rod 50.

In a second embodiment of the prior art approach shown in FIG. 2, a propellant 160 is placed in the empty passageway 140. This addition to the flashover indicator 10 of FIG. 2 improves the reliability of the indicator 10 leaving the arc horn 20 when flashover occurs. In addition, it functions to interrupt the dynamic current instantaneously by extinguishing the arc. However, this latter feature is not reliably performed with the propellant used in the prior art approach nor with the embodiments shown in FIG. 2.

2. Description of the Preferred Embodiment

One solution to the above problem was to put a continuous hole in the center of the propellant extending the longitudinal length of the passageway. However, this still did not solve the problem in that the voltage still went around the propellant and a higher voltage was created at the top end of the indicator than at the lower end of the indicator. This solution to the problem did not reliably operate since the arc would, at times, go between the propellant and the inside of the indicator and, at other times, it would go through the formed hole.

Figure 3:
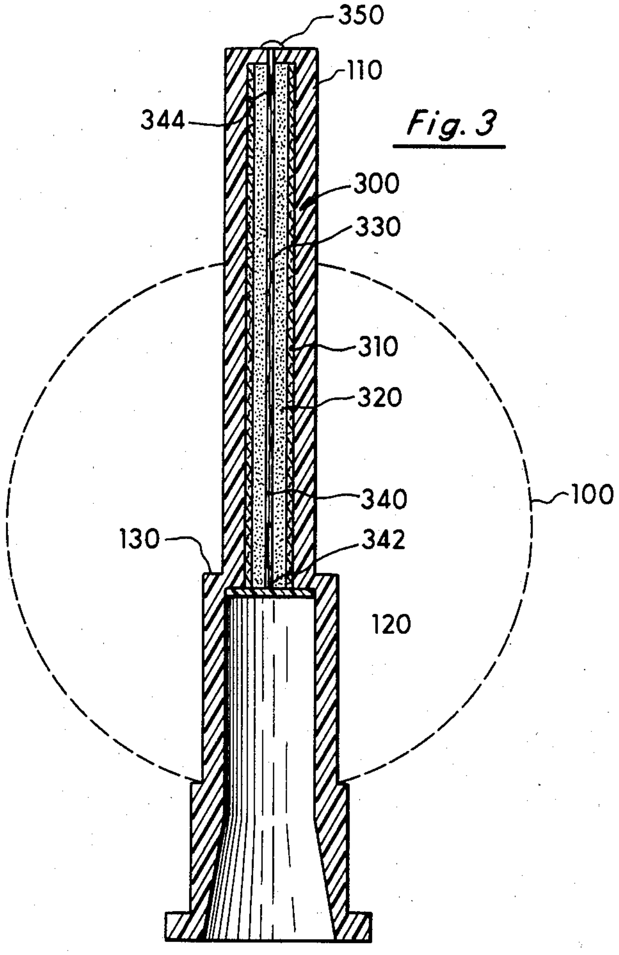
FIG. 3 sets forth in a cross-sectional side planar view the dynamic current interruption-type flashover indicator of the present invention.
Figure 4:
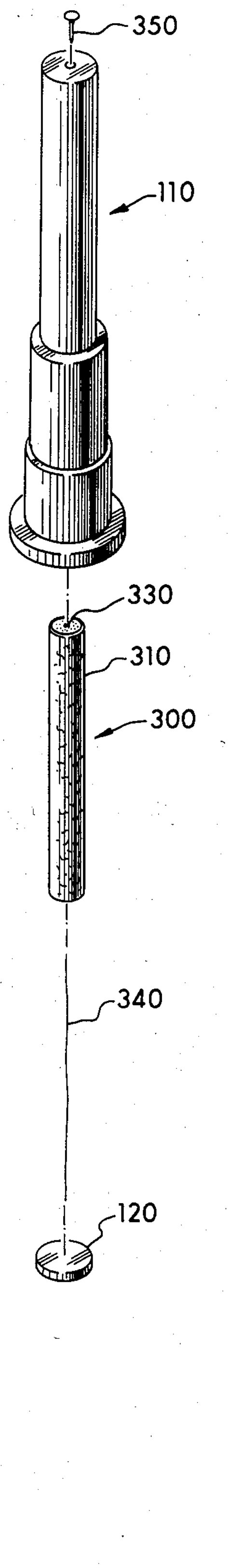
FIG. 4 is an exploded perspective view of the flashover indicator of FIG. 3.

In FIGS. 3 and 4, the details of the present invention are shown to include the addition of a cylinder 300 to the empty passageway 140. They cylinder 300 comprises a tubular shell 310 preferably made from cardboard or other paper material having an outside diameter slightly less than the inside diameter of passageway 140 so that the tube 310 can be slid into the passageway to press-fittingly engage the passageway 140 as shown in FIG. 4. The cardboard in tube 310 is preferably coated with a varnish-like material, or other suitable water repellent material, in order to keep moisture found in the environment from entering the tube 300 and accessing the contents of the tube.

The tube 300 contains propellant 320 and is placed in the interior of the tube 300. A hole 330 is formed through the chemical composition 320 and extends the entire length of the tube 300. The formed hole 330 is centrally located within the tube 300 and in the preferred embodiment is on the order of one or two millimeters in diameter.

The propellant is a highly hydrated, highly oxidized mineral salt and an inorganic fiber. In the preferred embodiment, the impulse rocket propellant is comprised of boric acid hydrate $HBO_2.H_2O$ and a plaster forming agent comprising calcium oxide hydrate $CaO.H_2O$ and sodium sulfate hydrate $Na_2SO_4.12H_2O$, all of which are commingled with a heat conducting inorganic fiber such as glass wool and all of which is the subject of co-pending application Ser. No. 526,631 and that material is herein incorporated by reference.

The hole 330 is made in the propellant 320 by placing the propellant in the interior of the tube 310 and inserting a rod, not shown in the drawing, at the desired location of the hole. After the propellant is dried, the rod is removed. A conductive copper wire 340 is then placed in the formed hole 330 to serve as a fuse and guide. This assembly is then inserted in the empty passageway 140 of the base member 110 of the flashover indicator 10. The separator plate 120 press-fittingly engages the base member to hold the tube within the chamber 140. Wire 340 has one end 342 near the separator plate 120 and has its second end 344 press-fittingly engaging a conductive pin 350. The conductive pin 350 has a pointed end and fits through the orifice 150 in a tight press-fitting engagement to enter the formed hole 330 and to press against the end 344 of wire 340 to make positive electrical contact with (i.e., to conductively abut) the wire fuse 340. The pin 350 seals with the base 110 to prevent water from entering the propellant 320. As shown in FIG. 3, when fully assembled, the wire fuse 340 extends the longitudinal length of the tube 300 nearly abutting the separation plate 120 at end 342 and making contact with the conductive pin 350 at end 344. The tube 300 is optional since it is to be understood that the propellant 320 could be loaded directly into the passageway 140.

Figure 5:
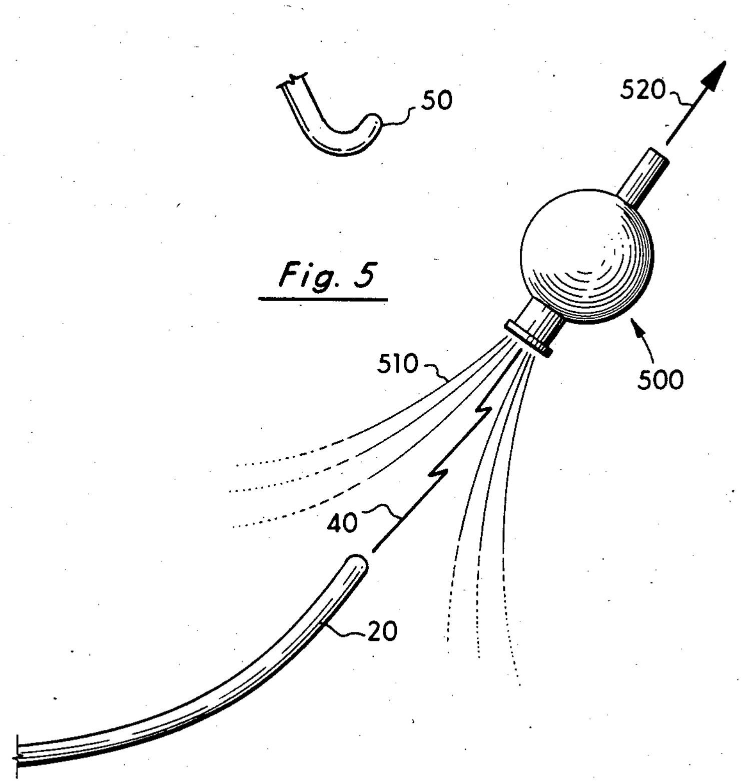
FIG. 5 is an illustration showing the leaving of the flashover indicator of the present invention from the tip of an arc rod.

In operation, the improved flashover indicator 500 of the present invention embodying the features set forth in FIGS. 3 and 4, functions as shown in FIG. 5. When lightening hits the transmission tower, the indicator immediately leaves the lower arc horn 20 under substantial rocket-like power because the lightning vaporizes the propellant 320 causing the indicator 500 to suddenly leave the arc horn 20 under substantial power. The indicator 500 leads the lightning arc 40 along a compulsory path following the indicator 500. Thus, the dynamic current in the arc 40 is interrupted.

From another viewpoint, when a flashover between the two arc rods 20 and 50 occurs, the arc is led on a compulsory path into the center of the propellant by the wire fuse 340 in the formed hole 330. The wire fuse 340 melts due to the dynamic current causing the high temperature in the arc to touch the propellant uniformly along the entire interior surface of the formed hole to spontaneously vaporize the propellant into a gaseous body and to cause the indicator 500 to travel as shown in FIG. 5. As shown in FIG. 5, when the drug explodes a propulsion gas or stream 510 exits from the indicator 500 causing the indicator to exit in the direction of arrow 520. This vapor trail 510 contains entrained salts which increase the conductivity of the vapor trail.

The method of the present invention as found in the above discussed apparatus is to make the formed hole in the middle of the propellant, to put the wire fuse in the hole, to then lead or direct the arc 40 on a compulsory path into the formed hole along the fuse, causing the fuse to become instantaneously melted along the length of said wire, and thereby vaporizing the propellant into a gaseous body to propel the indicator. The indicator leaves the arc horn 20 and causes the dynamic current to flow along an electrical bridge or path created by the vapor trail of the indicator in order to cut the current flow between the two arc horns 20 and 50.

While the present invention has been shown in a preferred embodiment, it is to be expressly understood that variations to the teachings thereof can be made and still fall within the teachings and scope of the following claims. For example, the flashover indicator of the present invention could be used to protect other sensitive objects such as buildings, generators, etc.

I claim:

1. An improved dynamic current interruption-type indicator responsive to lightning strikes having a base (110), with one end of said base being closed and having a formed orifice (150) therein, a globe (100) disposed over said base, and a separation plate (120) wherein said separation plate closes off a hollow cylindrically-shaped passageway (140) located on the interior of said base, said improvement comprising:

- a cylindrical tube (300) having an outside diameter slightly less than the inside diameter of said passageway (140) and said tube extending the longitudinal length of said passageway,
- a propellant (320) having water of hydration as a part of its chemical make-up disposed in the interior of said tube (300), said propellant (320) having a hole formed at the center of said tube (300) and said formed hold (330) extending the entire length of said tube, and
- a conductive wire (340) contained in said formed hole, said conductive wire (340) extending the longitudinal length of said tube (300), said wire being receptive of the arc from said lightning strike for melting and for uniformly causing the water of hydration of said propellant (320) to vaporize along the entire length of said formed hole.

2. The improved dynamic current interruption-type indicator of claim 1 further comprising a pin (350) engaging through said formed orifice (150) in said base (110) and into said formed hole (330) to conductively abut one end of said wire (340).

3. The improved dynamic current interruption-type indicator of claim 1 wherein said tube is covered by a water repellent material to prevent environment moisture from entering said propellant.

4. An improved dynamic current interruption-type indicator responsive to lightning strikes having a base (110), with one end of said base being closed and having a formed orifice (150) therein, a globe (100) disposed over said base, and a separation plate (120) wherein said separation plate closes off a hollow cylindrically-shaped passageway (140) located on the interior of said base, said improvement comprising:

- a propellant having water of hydration as a part of its chemical make-up (320) disposed in the interior of said passageway (140), said propellant having a hole (330) formed at the center of said propellant and said formed hole (330) extending the entire length of said propellant, and
- a conductive wire (340) contained in said formed hole (330), said conductive wire (340) extending the longitudinal length of said propellant (320), said wire (340) being receptive of the arc from said lightning strike for melting and for uniformly causing the water of hydration of said propellant to vaporize along the entire length of said formed hole.

5. The improved dynamic current interruption-type indicator of claim 1 further comprising a pin (350) engaging through said formed orifice (150) in said base (110) and into said formed hole (330) to conductively abut one end of said wire (340).

6. An improved dynamic current interruption-type indicator responsive to lightning strikes having a base (110), with one end of said base being closed and having a formed orifice (150) therein, and a separation plate (120) wherein said separation plate closes off a hollow cylindrically-shaped passageway (140) located on the interior of said base, said improvement comprising:

a cylindrical tube (300) having an outside diameter slightly less than the inside diameter of said passageway (140) and said tube extending the longitudinal length of said passageway, a propellant (320) having water of hydration as a part of its chemical make-up disposed in the interior of said tube (300), said propellant (320) having a hole formed at the center of said tube (300) and said formed hole (330) extending the entire length of said tube, a conductive wire (340) contained in said formed hole, said conductive wire (340) extending the longitudinal length of said tube (300), said wire being receptive of the arc from said lightning strike for melting and for uniformly causing the water of hydration of said propellant (320) to vaporize along the entire length of said formed hole, wherein said tube is covered by a water repellent material to prevent environment moisture from entering said propellant, and a pin (350) engaging through said formed orifice (150) in said base (110) and into said formed hole (330) to conductively abut one end of said wire (340).

7. A method for propelling dynamic current interruption-type indicators wherein said indicators have a base (110) with one end of said base being closed and with the opposing end being open, a globe (100) disposed over said base, and a separation plate (120) wherein said separation plate closes off the open end to form hollow cylindrically-shaped passageway (140) located on the interior of said base, said method comprising the steps of:

directing the arc from a lightning strike along a wire (340) located in a formed hole (330) extending the longitudingal length of a propellant having water of hydration as a part of its chemical make-up disposed in said passageway (140), instantaneously melting the wire (340) with the energy of said lightning strike along the entire length of said wire, and uniformly vaporizing the water of hydration of the propellant in said passageway so that said indicator becomes propelled through the release of the vaporized water of hydration through the open end of the base (110).

* * * * *